US011216691B2

(12) United States Patent
Zheng et al.

(10) Patent No.: US 11,216,691 B2
(45) Date of Patent: Jan. 4, 2022

(54) INPUT METHOD AND SYSTEM FOR ELECTRONIC DEVICE

(71) Applicants: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORP., Taiwan (CN)

(72) Inventors: Yongping Zheng, Shanghai (CN); Shih-Kuang Tsai, Shanghai (CN); Jing-Song Chang, Taiwan (CN)

(73) Assignees: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORP., Taiwan (CN)

( * ) Notice: Subject to any disclaimer, the term of this patent is extended or adjusted under 35 U.S.C. 154(b) by 247 days.

(21) Appl. No.: 16/474,358

(22) PCT Filed: Dec. 28, 2016

(86) PCT No.: PCT/CN2016/112576
§ 371 (c)(1),
(2) Date: Jun. 27, 2019

(87) PCT Pub. No.: WO2018/119728
PCT Pub. Date: Jul. 5, 2018

(65) Prior Publication Data
US 2019/0347519 A1 Nov. 14, 2019

(51) Int. Cl.
G06K 9/62 (2006.01)
G06F 3/0488 (2013.01)
G06K 9/48 (2006.01)

(52) U.S. Cl.
CPC ....... *G06K 9/6255* (2013.01); *G06F 3/04886* (2013.01); *G06K 9/48* (2013.01); *G06K 9/6232* (2013.01)

(58) Field of Classification Search
CPC ...... G06K 9/48; G06K 9/6255; G06K 9/6232; G06F 3/04886
(Continued)

(56) References Cited

U.S. PATENT DOCUMENTS 3,996,557 A 12/1976 Donahey
8,964,998 B1\* 2/2015 McClain .................. H03G 3/32
381/57
(Continued)

FOREIGN PATENT DOCUMENTS

CN 1520540 A 8/2004
CN 1795661 A 6/2006
(Continued)

OTHER PUBLICATIONS

The Internet Search Report for PCT application No. PCT/CN2016/112576.
(Continued)

*Primary Examiner* — Prabodh M Dharia
(74) *Attorney, Agent, or Firm* — Qinghong Xu

(57) ABSTRACT

An input method for an electronic device comprises steps of retrieving operation data according to a touch point made by a user on an input interface; generating a pending input pattern in response to the operation data of the touch point; retrieving a matched character corresponding to the pending input pattern, in response to a defined mapping relation of a plurality of input patterns and a plurality of characters; outputting the matched character.

15 Claims, 17 Drawing Sheets

(58) Field of Classification Search
USPC .......... 345/156, 173; 1/1; 709/203; 715/773
See application file for complete search history.

(56) References Cited

U.S. PATENT DOCUMENTS

| | | |
|---|---|---|
| 2002/0145592 A1 | 10/2002 | Schauer |
| 2003/0064686 A1 | 4/2003 | Thomason |
| 2006/0053387 A1* | 3/2006 | Ording ................. G06F 3/0236 715/773 |
| 2014/0160049 A1* | 6/2014 | Shin ................... G06F 3/04883 345/173 |
| 2016/0231871 A1* | 8/2016 | Davis ...................... G06F 3/016 |

FOREIGN PATENT DOCUMENTS

| | | |
|---|---|---|
| CN | 101303633 A | 11/2008 |
| CN | 101667074 A | 3/2010 |
| CN | 103235697 A | 8/2013 |
| CN | 103853480 A | 6/2014 |
| CN | 104898969 A | 9/2015 |
| TW | I303378 B | 11/2008 |
| TW | 201322111 A | 6/2013 |
| TW | 201413538 A | 4/2014 |

OTHER PUBLICATIONS

The 1st Office Action dated Jan. 18, 2019 for TW patent application No. 106144273.
The 1st Office Action dated Jul. 21, 2021 for CN patent application No. 201680003501.2.

* cited by examiner

INPUT METHOD AND SYSTEM FOR ELECTRONIC DEVICE

CROSS REFERENCE

This application is a continuing application of International Application No. PCT/CN2016/112576, filed on Dec. 28, 2016, and the entire contents thereof are incorporated herein by reference.

TECHNICAL FIELD

The present disclosure relates to the field of electronic input technology, specifically to a fast input method and system with control of a single finger for an electronic device.

BACKGROUND

With the development of science and technology, more and more electronic devices enter into our life. Within interactions of human and computers (electronic devices), input method, the most important tool, plays a specific role. The current input method, in general, is performed with users' finger, and adapts a device, e.g. a soft keyboard, a keyboard, or a mouse, as an input tool. The input method performed with users' finger is more convenient than other methods. However, there are still some defects existed in the current input method:

(1) The current input method is mostly including an encoded input method performed by an English QWERTY keyboard or a numeric keyboard. The character presented on the key has a fixed key position on the keyboard. The user needs to use multiple fingers and have lots of practices of finger input before being familiar with the current input method.

(2) It takes plenty of keys to support the defined 26 English characters or other encoding characters whether the English QWERTY keyboard or the numeric keyboard is used.

(3) The current mouse and the current keyboard are separate devices which will occupy significant space and are lack of portability. Moreover, the current mouse and the current keyboard require manual switching which will increase complexity during operation.

SUMMARY

In view of the detects of the prior art, the present disclosure provides an input method and system for an electronic device, to match an input pattern with a character in response to the shape of the input pattern, therefore fast input of all characters will be achieved with a single finger, and from which simple features can be extracted for encoding and be memorized much easier.

In one embodiment of the present disclosure, an input method for an electronic device is provided, the input method includes steps of: retrieving operation data according to a touch point made by a user on an input interface; generating a pending input pattern in response to the operation data of the touch point; retrieving a matched character corresponding to the pending input pattern, in response to a defined mapping relation of a plurality of input patterns and a plurality of characters; and outputting the matched character.

In another embodiment of the present disclosure, an input system for an electronic device is provided, the input system includes a mapping relation storage unit, an operation data retrieving unit, an input pattern generating unit, a matched character retrieving unit, and a matched character output unit. The mapping relation storage unit is configured to store a defined mapping relation of a plurality of input patterns and a plurality of characters. The operation data retrieving unit is configured to retrieve operation data according to a touch point made by a user on an input interface. The input pattern generating unit is configured to generate a pending input pattern in response to the operation data of the touch point. The matched character retrieving unit is configured to retrieve a matched character corresponding to the pending input pattern, in response to the defined mapping relation of the plurality of input patterns and the plurality of characters. The matched character output unit is configured to output the matched character.

The input method and system for the electronic device provided by the present disclosure have advantages of:

The present disclosure provides a technical solution of retrieving the matched character in response to the sliding track of the operation, by which fast input of all characters will be achieved with a single finger. The technical solution matches the input pattern with the character in response to the shape of the input pattern, from which simple features can be extracted for encoding, and encoding rules will be easily memorized by the user without excessive memorization and practice. Moreover, excessive keys for support are unnecessary, and the size of the input device will be decreased, which are greatly convenient for users.

BRIEF DESCRIPTION OF THE DRAWINGS

Embodiments of the present disclosure will now be described, by way of example only, with reference to the accompanying schematic drawings in which corresponding reference symbols indicate corresponding parts, and in which.

DETAILED DESCRIPTION

In the following, embodiments of the present disclosure will be described in detail referring to figures. The concept and its realizations of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to the technicians in the art fully. Same reference signs in the figures refer to same or similar structures, so repeated description of them will be omitted.

The features, structures or characteristics described can be combined in any appropriate way in one or more embodiments. In the description below, many specific details are provided to explain the embodiments of the present disclosure fully. However, the technicians in the art should realize that, without one or more of the specific details, or adopting other methods, components, materials etc., the technical proposal of the present disclosure can still be realized. In certain conditions, structures, materials or operations well known are not shown or described in detail so as not to obfuscate the present disclosure. The technical contents of the present disclosure will be further described below with reference to the figures and embodiments. It should be stated that a plurality of embodiments described below along with their combinations and varieties, beyond doubt are within the scope of the present disclosure.

Figure 1:
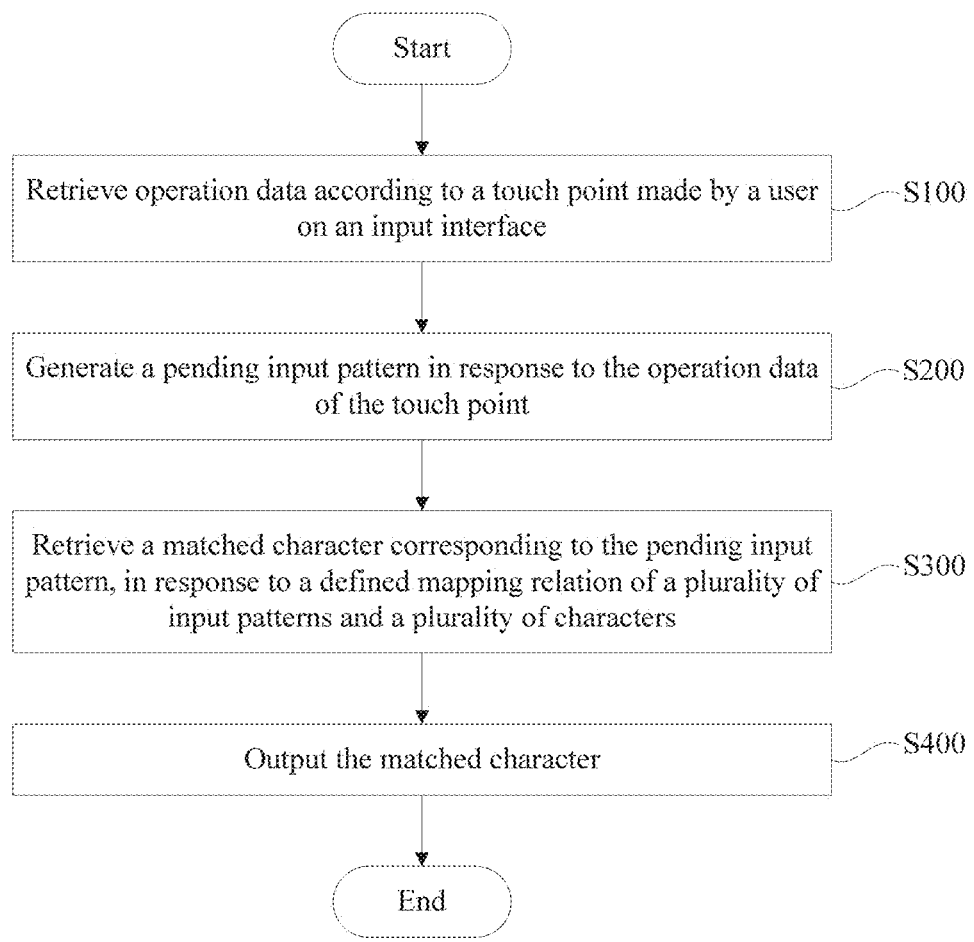
FIG. 1 shows a flowchart of an input method for an electronic device of one embodiment of the present disclosure.

As shown in FIG. 1, an input method for an electronic device of one embodiment of the present disclosure, and the input method includes steps of: S100: retrieving operation data according to a touch point made by a user on an input interface; S200: generating a pending input pattern in response to the operation data of the touch point; S300: retrieving a matched character corresponding to the pending input pattern, in response to a defined mapping relation of a plurality of input patterns and a plurality of characters; and S400: outputting the matched character.

The input method of present disclosure retrieves the input content of the user by matching the input pattern with the character. Therefore, pressing the keys one by one is not necessary, and the user's finger is required to slide on the input interface for inputting a meaningful pattern, which allows the user to have easy input with a single finger. Moreover, there is no need to have extra key configurations but a touch control input interface. Thus, the size of the input device with the input method is decreased.

Furthermore, the mapping relation of the plurality of input patterns and the plurality of characters may be a factory setting of the input device, or predefined by the user. That is, a step of defining the mapping relation of the plurality of input patterns and the plurality of characters is performed before the step S100 of retrieving the operation data of the touch point. The configuration of the mapping relation of the plurality of input patterns and the plurality of characters allows the input patterns matched with the characters designed in response to the shapes of the characters. It is convenient for the user to memorize the mapping relation of an input pattern and a corresponding matched character, since shapes of the characters are quite similar to shapes of the input pattern. Thus, the users are then familiar with the input method of the present disclosure and have no need of excessive practice. In addition, the characters of the present disclosure include English capital characters, English lowercase characters, Chinese characters, numeric characters, punctuation characters, and unit characters etc., which are not limited to the ones listed herein, and are all within the scope of protection of the present disclosure.

Figure 2:
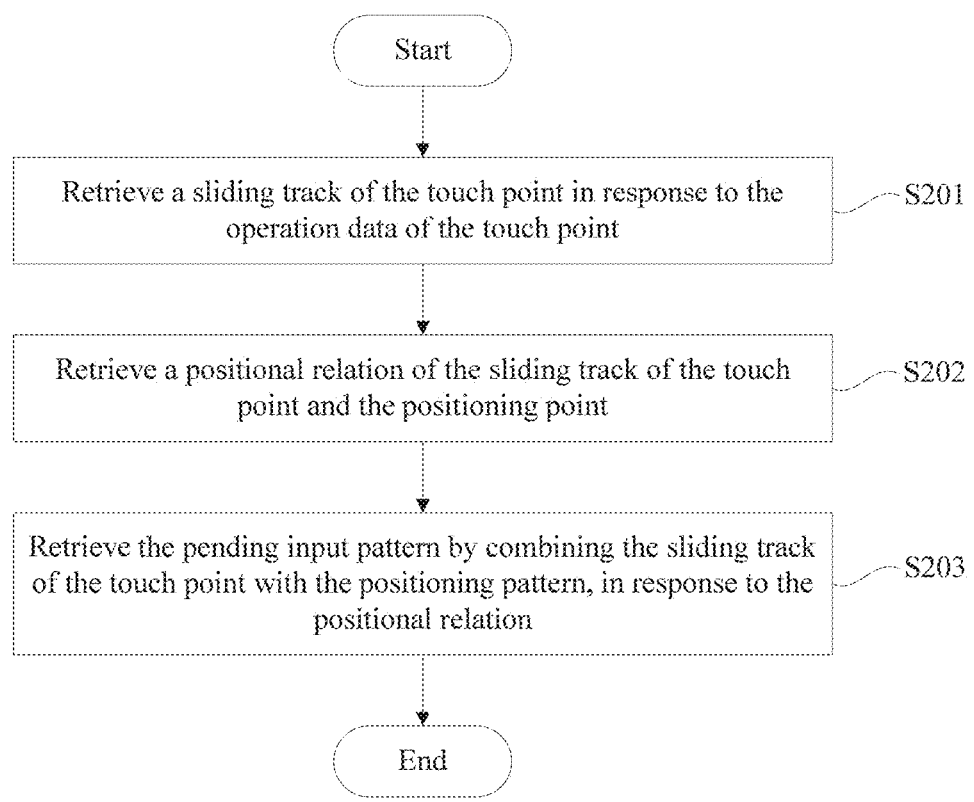
FIG. 2 shows a flowchart of generating a pending input pattern of one embodiment of the present disclosure.

FIG. 2 shows a flowchart of generating the pending input pattern of one embodiment of the present disclosure. In this embodiment, at least one positioning point is provided in the input interface, and the positioning point is used to define a positioning pattern.

After the positioning point is displayed on the interface, the users are able to input upon the position of the positioning point during input operation. The step of generating the pending input pattern is performed after the operation data of the users is received. The step of generating the pending input pattern includes the sub steps of: S201: retrieving a sliding track of the touch point in response to the operation data of the touch point; S202: retrieving a positional relation of the sliding track of the touch point and the positioning point; and S203: retrieving the pending input pattern by combining the sliding track of the touch point and the positioning pattern, in response to the positional relation.

In one embodiment, the positional relation of the sliding track of the touch point and the positioning point includes different angles and directions. For example, the sliding track of the touch point is located above the positioning point, below the positioning point, on the left of the positioning point, or on the right of the positioning point. The combining method of the sliding track and the positioning pattern includes merging, intersecting and subtracting. In one embodiment, the pending input pattern includes a merging area of the sliding track and the positioning pattern, an intersecting area of the sliding track and the positioning pattern, area of the sliding track excluding an overlapping area of the sliding track and the positioning pattern, and an area of the positioning pattern excluding the overlapping area of the sliding track and the positioning pattern. The combining method is selected in response to actual needs, and is not limited to the cases listed herein.

Even the shapes of the sliding tracks are the same, but the input patterns may be different if the positional relation of the sliding tracks and the positioning points are different. For example, with respect to a positioning point, a horizontal line above the positioning point and a horizontal line below the positioning point have the same length, but respectively present different input patterns. The positioning point is as a positioning pattern, and the positioning pattern is combined with a horizontal line to form a pending input pattern. Similarly, when there are more than one positioning points and the positioning points are formed a positioning pattern, the input pattern are formed by combining the positioning pattern and the sliding track.

For example, when two positioning points form a positioning line, the positioning line and the sliding track can be combined to form different input patterns. When three positioning points form a positioning triangle, and the positioning triangle and the sliding track can be combined to form different input patterns, etc. There are not limited to the cases listed herein, and all are within the scope of protection of the present disclosure. In one embodiment, the positioning pattern of the present disclosure includes at least one point, at least one straight line, at least one curve line, at least one broken line, at least one circle, at least one polygon, or a combination thereof, wherein the circle includes the perfect circle and the ellipse.

Figure 3:
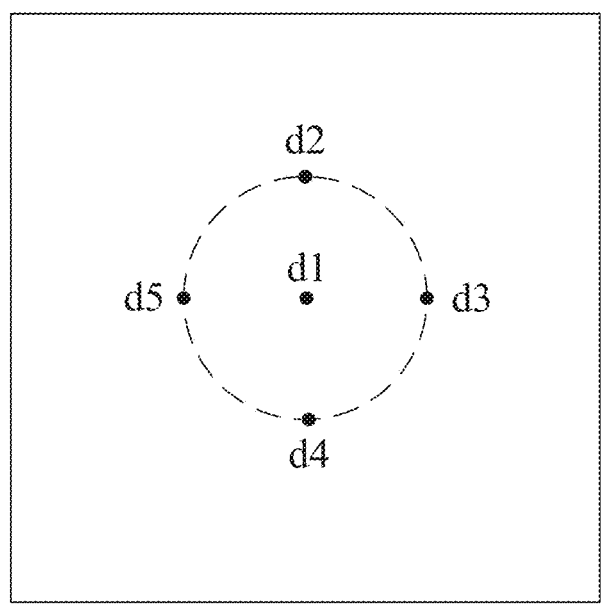
FIG. 3 shows a schematic view of a positioning circle of one embodiment of the present disclosure.

FIG. 3 shows a schematic view of a positioning circle of one embodiment of the present disclosure. In this embodiment, five positioning points are provided, and the five positioning points include a central positioning point d1 and four edge positioning points d2 to d5. The distances between the edge positioning points d2 to d5 and the central positioning point d1 are the same. The positioning circle has the central positioning point d1 as the center, and the distance between each of the edge positioning points d2 to d5 and the central positioning point d1 is as the radius. Moreover, the four edge positioning points d2 to d5 are evenly located at the circumference of the circular area (the positioning circle).

Furthermore, when the positioning pattern is a positioning circle, the number of the positioning points may be adjusted (increased or decreased), and the positional relation between the positioning points may be adjusted in response to needs. For example, the number of the edge positioning points is further increased to eight edge positioning points, the central positioning point is removed, or the number of the edge positioning points is decreased to three edge positioning points etc., which will achieve the goal of forming the input pattern by combining the positioning pattern and the sliding track and are not limited to the cases listed herein. Moreover, the positioning circle is an embodiment of the present disclosure. As described above, there are one or more positioning points. When there is a plurality of positioning points, the positioning patterns formed by the positioning points are different.

Figure 4:
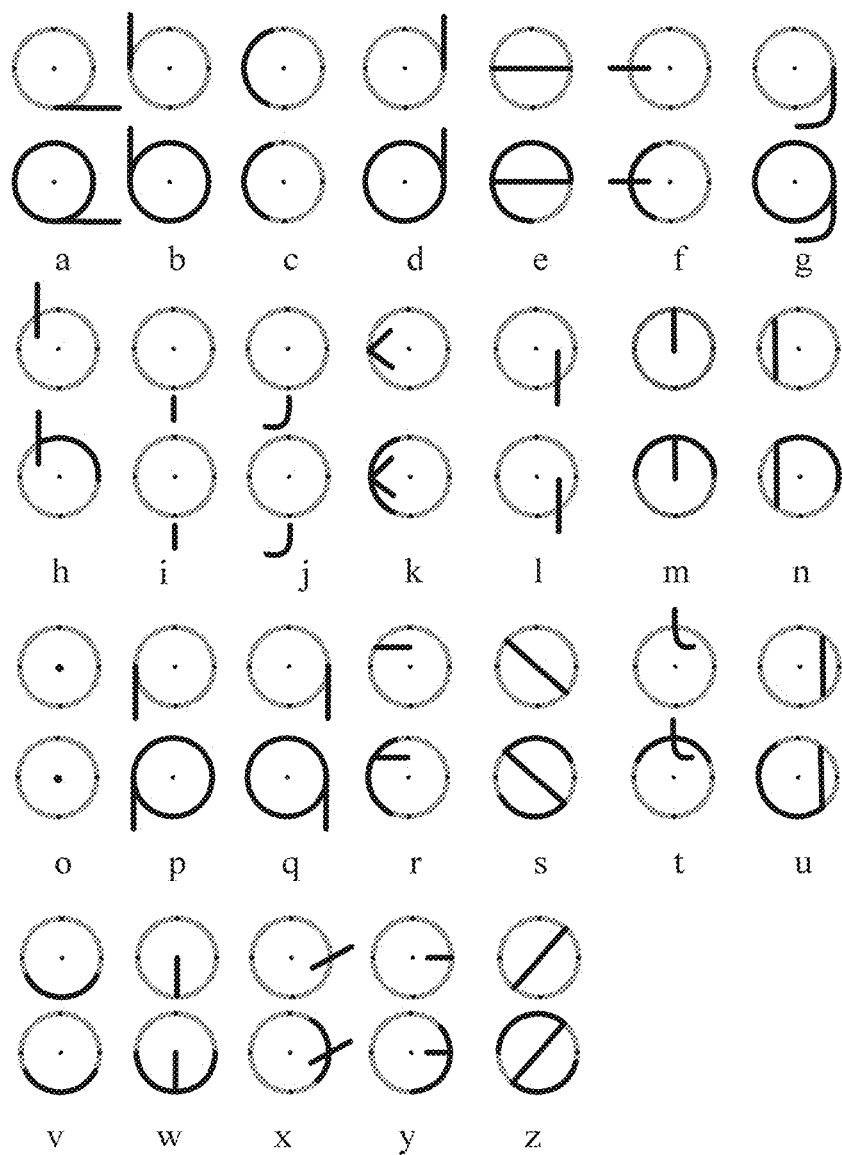
FIG. 4 shows a schematic view of mapping relation of input patterns and English lowercase characters of one embodiment of the present disclosure.

FIG. 4 shows a schematic view of English lowercase characters and corresponding input patterns of one embodiment of the present disclosure. The positioning circle in FIG. 3 is used as a reference in this embodiment, and the pending input pattern is formed by combining the positioning circle and the sliding track of the touch point of the user. The input pattern is similar to the shape of the corresponding matched character. In this embodiment, the combination type is merging, which means the pending input pattern is the pattern formed by merging the positioning circle and the sliding track. As shown in FIG. 4, except the positioning circle, the pattern is the sliding track of the touch point of the user. It can be seen that the drawing of the sliding track is quite simple, for example, the English character "a" is formed by drawing a horizontal line below the positioning circle, since the input pattern combining the horizontal line drawn and the positioning circle is much like the lowercase "a". The English character "b" is formed by drawing a vertical line on the left of the positioning circle, since the input pattern combining the left vertical line and the positioning circle is much like the lowercase "b". The English character "d" is formed by drawing a vertical line on the right of the positioning circle, since the input pattern combining the right vertical line and the positioning circle is much like the lowercase "d".

The following is a brief description of the comparison of the characters and the input patterns in FIG. 4. The mapping relation of the characters and the input patterns in FIG. 4 is an example, which is not a limitation to the scope of protection of the present disclosure. As shown in FIG. 4, according to each character, the sliding track is shown on the first row, and the input pattern formed by combining the sliding track and the positioning circle is shown on the second row.

Character "a": the input pattern includes the positioning circle and a horizontal line on the bottom-right of the positioning circle, and the input pattern is quite similar to the handwritten character "a". Except the positioning circle, the sliding track input by the user is the horizontal line on the bottom-right of the positioning circle. The combination type for the positioning circle and the sliding track is merging.

Character "b": the input pattern includes the positioning circle and a vertical line on the top-left of the positioning circle, and the input pattern is quite similar to the shape of the character "b". Except the positioning circle, the sliding track input by the user is the vertical line on the top-left of the positioning circle. The combination type for the positioning circle and the sliding track is merging.

Character "c": the circular shape of the positioning circle is used for inputting, since the shape of the character "c" has a portion of the circular shape. A sliding track with a shape like the character "c" is drawn along a left portion of the circular shape of the positioning circle, and the combination type for the sliding track and the positioning circle is intersecting.

Character "d": the input pattern includes the positioning circle and a vertical line on the top-right of the positioning circle, and the input pattern is much similar to the shape of the character "d". Except the positioning circle, the sliding track input by the user is the vertical line on the top-right of the positioning circle, and the combination of the positioning circle and the sliding track is merging. The sliding tracks of the character "b" and the character "d" are with the same vertical lines. However, different positional relations of the sliding tracks with respect to the positioning circle make the difference.

Character "e": the input pattern includes a portion of the positioning circle, and the sliding track is a horizontal line in the middle of the positioning circle. The input pattern is formed by merging the sliding track and a portion of the positioning circle. The portion of the positioning circle includes an upper half and a bottom-left quarter of the circular shape of the positioning circle.

Character "f": the input pattern includes a portion of the positioning circle, and the sliding track is a horizontal line on the left of the positioning circle. The input pattern is formed by merging the sliding track and a portion of the positioning circle, including a left half of the circular shape of the positioning circle.

Character "g": the input pattern includes the positioning circle and a hook below the positioning circle, and the input pattern is quite similar to the shape of the character "g". The combination type for the positioning circle and the sliding track is merging.

Character "h": the input pattern includes a portion of the positioning circle, and the sliding track is a vertical line intersecting the top-left quarter of the circular shape of the positioning circle. The input pattern is formed by merging the sliding track and a portion of the positioning circle, wherein the sliding track serves as the vertical line of the character "h", and the portion of the circular shape of the positioning circle serves as the rest of the character "h".

Character "i": the sliding track is a vertical line below the positioning circle, and the input pattern is formed by combining the sliding track and a point on the bottom of the positioning circle, wherein the point on the bottom of the positioning circle serves as the point of the character "i", and the vertical line of the sliding track serves as the vertical line of the character "i". The combination type for the sliding track and the portion of the positioning circle is merging.

Character "j": the sliding track is a hook below the positioning circle, and the input pattern is formed by combining the sliding track and the point on the bottom of the positioning circle, wherein the point on the bottom of the positioning circle serves as the point of the character "j". The combination type for the sliding track and the portion of the positioning circle is merging.

Character "k": the sliding track has two rays within the positioning circle, and the two rays are converged at one point of the positioning circle. The input pattern is formed by combining the two rays and a left portion of the circular shape of the positioning circle, and the input pattern is quite similar to the shape of the character "k". The combination type for the sliding track and the portion of the positioning circle is merging.

Character "l": the sliding track is a vertical line on the bottom-right of the positioning circle, and the positioning circle serves as positioning. In order to differentiate the character "l" from other characters, the vertical line of the character l is defined on the bottom-right of the positioning circle, since the vertical line is as the same as the shape of the sliding tracks of the characters "b", "d", "h" and "i".

Character "m": the sliding track is a vertical line within an upper portion of the positioning circle, and the input pattern is formed by combining the sliding track and the upper half of the circular shape of the positioning circle. The combination type for the sliding track and the portion of the positioning circle is merging.

Character "n": the sliding track is a vertical line within a left portion of the positioning circle, and the input pattern is formed by merging the sliding track and a portion of the positioning circle, wherein the sliding track serves as a portion of the character "n" which is the left vertical line of the character "n". A portion of the circular shape of the positioning circle serves as the rest of the character "n".

Character "o": the sliding track is a point in the center of the positioning circle, and the input pattern is the entire circular shape of the positioning circle. The sliding track acts as an indicator, which is distinguishing the sliding track from the positioning circle without any input.

Character "p": the sliding track is a vertical line on the bottom-left of the positioning circle, and the input pattern is formed by merging the sliding track and the positioning circle, wherein the sliding track serves as the left vertical line of the character "p", and the positioning circle serves as the right circle of the character "p".

Character "q": shapes of the characters "q" and "p" are bilaterally symmetric. Therefore, input patterns of the characters "q" and "p" are bilaterally symmetric. The sliding track of the characters "q" is a vertical line on the bottom-right of the positioning circle, and the input pattern is formed by merging the sliding track and the positioning circle.

Character "r": the sliding track is a horizontal line intersecting the top-left portion of the circular shape of the positioning circle, and the input pattern is formed by combining the sliding track and a left portion of the circular shape of the positioning circle. The combination type for the sliding track and the portion of the positioning circle is merging.

Character "s": the sliding track is a diagonal line from the top-left to the bottom-right within the positioning circle, and the sliding track and a right portion and a left portion with respect to the diagonal line of the circular shape of the positioning circle are combined into a pattern with a shape being like the character "s". The combination type for the sliding track and the portion of the positioning circle is merging.

Character "t": the sliding track is a hook on the top of the positioning circle, and the input pattern is formed by combining the hook and a portion intersecting the hook of the circular shape of the positioning circle, wherein the portion of the circular shape serves as the horizontal line of the character "t". The combination type for the sliding track and the portion of the positioning circle is merging.

Character "u": the sliding track is a vertical line on the right within the positioning circle, and the input pattern is formed by merging the sliding track and a portion of the positioning circle, wherein the vertical line serves as the right vertical line of the character "u", and a portion of the circular shape of the positioning circle serves as the rest of the character "u".

Character "v": the input pattern of the character "v" is similar to the input pattern of the character "c", which includes a bottom portion of the circular shape of the positioning circle. The sliding track is a curve line along the bottom portion of the circular shape of the positioning circle, and the input pattern is formed by intersecting the sliding track and the portion of the positioning circle.

Character "w": the sliding track is a vertical line on the bottom within the positioning circle, and the vertical line and a lower half of the circular shape of the positioning circle are combined into the input pattern of the character "w", longitudinally symmetric with the input pattern of the character "m". The combination type for the sliding track and the portion of the positioning circle is merging.

Character "x": the sliding track is an oblique line intersecting a right portion of the positioning circle, and the oblique line serves as the right-to-left oblique line of the character "x", and the right portion of the circular shape of the positioning circle serves as the left-to-right oblique line of the character "x". The input pattern is formed by merging the sliding track and the portion of the positioning circle.

Character "y": the sliding track is a horizontal line on the right within the positioning circle, and the input pattern is formed by merging the sliding track and a portion of the circular shape of the positioning circle.

Character "z": the sliding track is a right-to-left oblique line with the positioning circle, bilaterally symmetric with the sliding track of the character "s". The input pattern is formed by combining the oblique line and a left portion and a right portion with respect to the oblique line of the circular shape of the positioning circle. The combination type for the sliding track and the portion of the positioning circle is merging.

Figure 5:
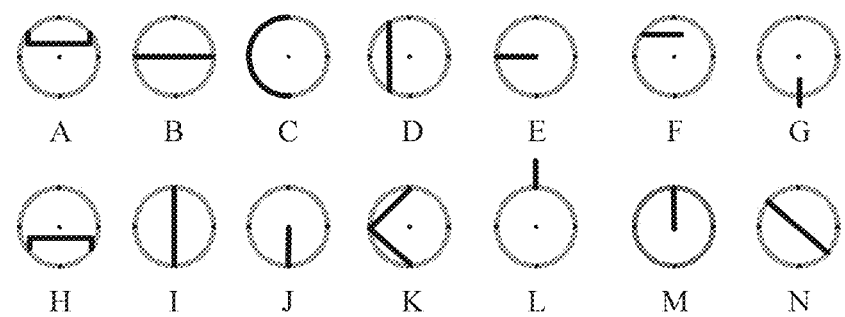
FIG. 5 shows a schematic view of mapping relation of input patterns and English capital characters of one embodiment of the present disclosure.

FIG. 5 shows a schematic view of the mapping relation of input patterns and English capital characters of one embodiment of the present disclosure. The positioning circle in FIG. 3 is used in this embodiment, and the darker portion, except the positioning circle and the central positioning point, is the sliding track. The sliding track is partially or completely overlapped with the positioning circle. FIG. 5 shows the mapping relation of input patterns and a portion of English capital characters in this embodiment. The rest portion of English capital characters (not shown) is encoded in a similar way, which is not described one by one. Moreover, the mapping relation herein is only an example, and the mapping relations with other encoding methods are used in other practices. For example, it is within the scope of the present disclosure to change the shape of the input patterns and the shape of the sliding track which are corresponding to each character.

Figure 6:
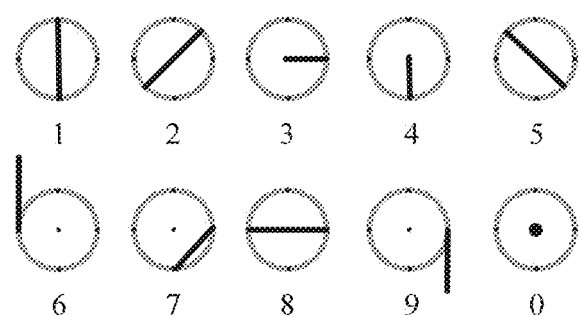
FIG. 6 shows a schematic view of mapping relation of input patterns and numeric characters of one embodiment of the present disclosure.

FIG. 6 shows a schematic view of the mapping relation of input patterns and numeric characters of one embodiment of the present disclosure. Similarly, the mapping relation herein is only an example, other examples. It is within the scope of the present disclosure to change the shape of the input patterns and the shape of the sliding track which are corresponding to each character. Moreover, the characters in the present disclosure include not only the English lowercase characters, the English capital characters and the numeric characters shown in FIGS. 4 to 6, but also punctuation characters, unit characters and emotion characters inputted by the user. For example, when a curve line with two ends up is drawn within the positioning circle, a smile face is presented accordingly. When a curve line with two ends down is drawn within the positioning circle, a sad face is presented accordingly.

In this way, the sliding input is performed based on the positioning pattern. In one aspect, the positioning pattern, during input operation made by the user, the position of the positioning pattern is used as a reference for sliding input, since the positioning pattern plays a certain auxiliary role to the user for the sliding track input. In addition, the positioning pattern plays a certain role in reminding the user to have memory of the input pattern corresponding to the pending input character. For example,when the user sees a positioning circle, associated with the lowercase letter of the character "a", it is easy to the user to think of adding a rightward horizontal line sliding track below the positioning circle and a pattern similar to the lowercase "a" is then obtained. During the user's input operation, the positioning point helps the user to draw a more standard sliding track. For example, when the user draws the sliding track of the character "e", a standard horizontal line dividing the positioning circle will be obtained by connecting the two positioning points on both sides. Moreover, certain small deviations are allowed during the user's input operation. For example, there is a small angle deviation, caused by imprecise operations, between the horizontal line drawn and a predefined standard horizontal line. If the deviation value of the small angle deviation is within an allowable threshold, the horizontal line is still determined as a predefined standard horizontal line.

Furthermore, the input pattern is obtained by combining the positioning pattern and the sliding track. The positioning pattern serves as a portion of the shape of character, such that the full pattern matched with the shape of the character will be obtained by drawing a sliding track with the rest portion of the character. Thus, the input workload of the user is then reduced. For example, when the lowercase character "z" is inputted by the user and there is no positioning pattern existed, a pattern shape similar to the character "z" should be drawn and at least two large turns in the sliding process and the sliding track is extremely long. However, with the positioning circle, only an oblique line within the positioning circle is necessary to be drawn, and the combination type of the oblique line and the positioning circle is pretty like the lowercase character "z".

In another aspect, when recognizing the input pattern, it is just to recognize the sliding track and the positional relation of the sliding track and the positioning point, since the positioning pattern is pre-stored in the input system. The input pattern may be obtained by combining the sliding track and the positioning pattern pre-stored by the input system. The recognizing speed is faster, and the character input efficiency is improved. For example, when the lowercase character "w" is inputted by the user and there is no positioning pattern existed, an extremely long sliding track is drawn, wherein at least three large turns in the sliding process. The recognition of the system, in the meantime, is quite complicated, due to recognizing operation data of the extremely long sliding track, recognizing data points of each inflection point, etc., and the amount of data processed is significant large. After the positioning circle of the present disclosure is added into the system, only a vertical line within the lower half of the positioning circle is need to be drawn by the user, and the vertical line and the positional relation of the vertical line and each positioning point are recognized by the system. Therefore, the amount of data processed is significantly.

The positioning circle is one of preferred embodiments, and the present disclosure describes the technical solution with the embodiments as mentioned above. It should be understood that the above technical effects will also be achieved with other positioning patterns. Moreover, the mapping relation of the lowercase characters and the input patterns is an example. In practice, input patterns of other types of characters and alternative shapes of the input patterns are all within the scope of protection of the present disclosure.

In addition, the same input pattern may correspond to a plurality of characters when there are multiple types of characters existed. For example, the input pattern of the lowercase character "b" in FIG. 4 is very close to, even the same as the input pattern of the numeric character "6" in FIG. 6. Please refer to the following two solutions in order to avoid confusion during user's inputting.

(1) Display all of the matched characters on the input interface as candidate characters, if there are more than one matched characters after the input pattern is obtained.

Figure 7:
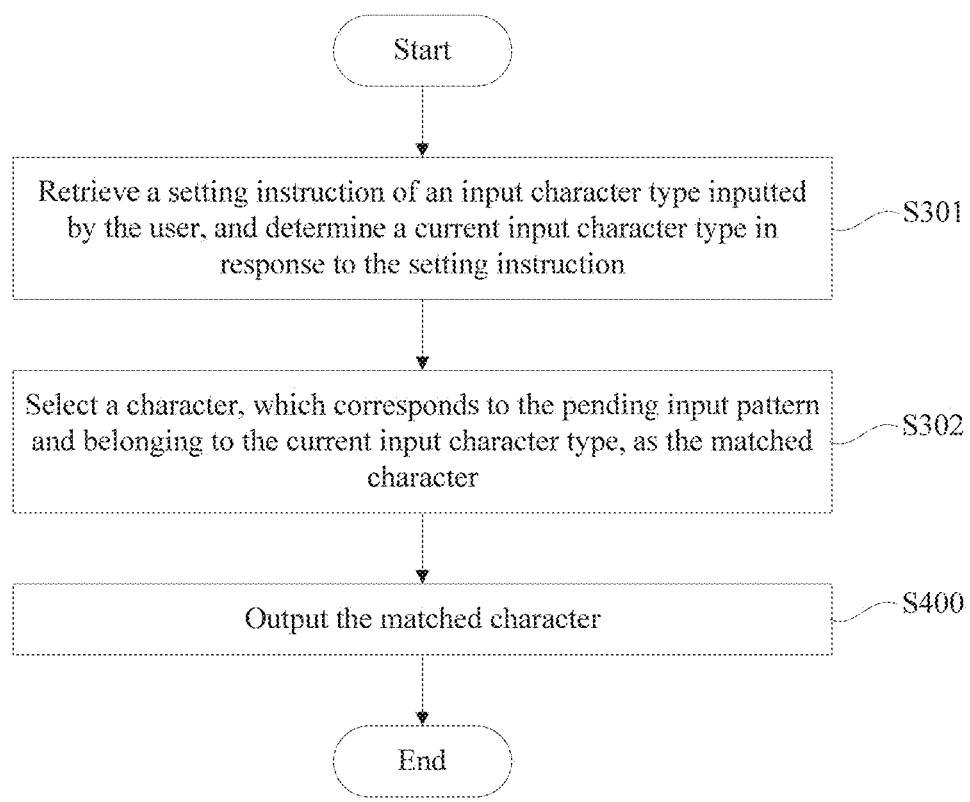
FIG. 7 shows a flowchart of selecting an input character type of one embodiment of the present disclosure.

(2) Predefine the current input character type and select a matched character in response to the current input character type, please refer to the flow chart shown in FIG. 7.

In step S301, a setting instruction of an input character type inputted by the user is retrieved, and a current input character type in response to the setting instruction is determined. The setting instruction of the input character type is defined before selecting the matched character, or be defined before inputting the sliding track by the user.

The setting instruction of the input character type is defined by setting a switching button in the input interface, or defined by inputting a specific pattern in the input interface to switch between different input character types. For example, if the current input character type is the English lowercase character, when an input pattern is retrieved, a matched English lowercase character in response to the input pattern will be obtained. Then, when English capital characters are to be obtained, in response to the predefined specific pattern to switch the input character type, a tick is drawn within the positioning circle, and the input character type is switched to the English capital characters. Thereby, the input pattern is matched with the English capital character when inputting. In one embodiment, specific patterns to switch the input character type, the switching order and the switching instructions may be predefined by the user.

In step S302, a character, which corresponds to the pending input pattern and belonging to the current input character type, is selected as the matched character. Afterward, the step S400 is proceeded.

Figure 8:
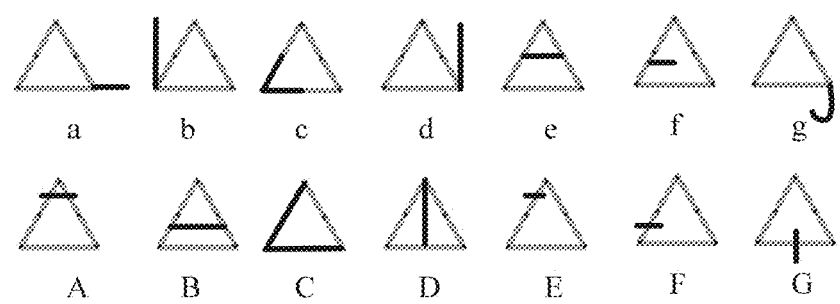
FIG. 8 shows a schematic view of mapping relation of input patterns and characters of another embodiment of the present disclosure.

As described above, the positioning pattern of the present disclosure is a circle but not limited thereto. FIG. 8 shows a schematic view of the mapping relation of input patterns and characters of another embodiment of the present disclosure. The difference between this embodiment and the previous embodiment is that the positioning pattern is triangular and the number of the positioning points is three or more. FIG. 8 exemplarily shows input patterns corresponding to a portion of English lowercase characters and a portion of English capital characters when a triangle positioning pattern being used, wherein the darker portion, except the positioning triangle pattern, is the sliding track, and the sliding track is intersected with, connected to, or overlapped with the positioning triangle.

Figure 9:
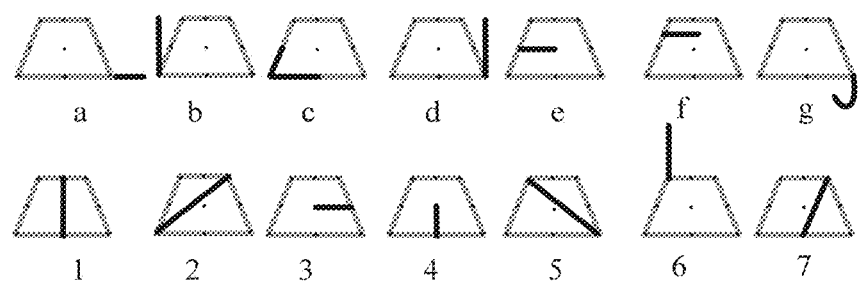
FIG. 9 shows a schematic view of mapping relation of input patterns and characters of anotherembodiment of the present disclosure.

FIG. 9 shows a schematic view of the mapping relation of input patterns and characters of another embodiment of the present disclosure. The difference between this embodiment and the previous two embodiments is that the positioning pattern is a trapezoid and the number of the positioning points is four or more. FIG. 9 exemplarily shows input patterns corresponding to a portion of English lowercase characters and a portion of English capital characters when a trapezoid positioning pattern being used, wherein the darker portion, except the positioning trapezoid, is the sliding track, and the sliding track may intersect, be connected to, or overlap the positioning trapezoid.

In order to avoid multiple selections, e.g. one input pattern corresponding to a plurality of characters, the mapping relation of the input patterns and the characters of the present disclosure is defined as one-to-one. Therefore, it is unnecessary to select the input character type. A unique matched character will be obtained when a sliding track is input. When the character cannot be correctly determined, e.g. the input sliding track is unclear, the potential characters similar to the input pattern of the sliding track will be provided to the user to make a selection, or a message, e.g. incorrect slide track, is pushed to the user.

In the mapping relation of the input patterns and the characters of each embodiment of the present disclosure, each of the sliding tracks is drawn in one stroke, which is also a preferred technical effect achieved by the technical features of the present disclosure. By drawing the sliding track of the character of the present disclosure in one stroke, the operation time of the user is greatly decreased, and the drawing of the sliding track is pretty simple, by drawing a straight line or a simple hook, which is convenient to be matched with the positioning point and the positioning pattern. During encoding, in practice, the sliding track is defined as a more complex pattern. For example, the sliding track includes at least one point, at least one straight line, at least one broken line, at least one curve line, at least one circle, at least one polygon or a combination thereof, wherein the circle herein includes the perfect circle and the ellipse.

Figure 10:
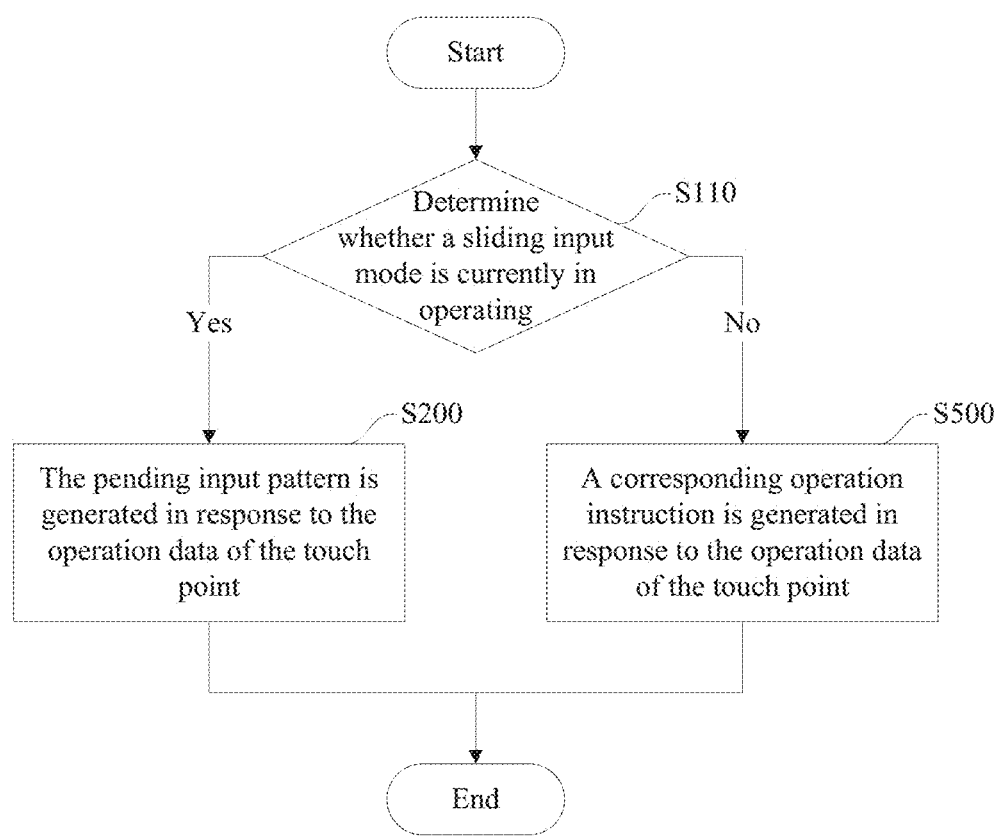
FIG. 10 shows a flowchart of determining an input mode of one more embodiment of the present disclosure.

As shown in FIG. 10, the input method for the electronic device of the present disclosure includes not only recognizing sliding input, but also recognizing non-sliding input. For example, when the user is to select a certain function by clicking or dragging instead of inputting characters, it is understood that the method of the present disclosure perform switching between keyboard input and mouse input by selecting the input mode. Therefore, the method of the present disclosure further includes the step S110, determining whether a sliding input mode is currently in operating, before the step of generating the pending input pattern.

When the sliding input mode is currently in operating, the step S200 is processed. The pending input pattern is generated in response to the operation data of the touch point is performed.

When the sliding input mode is not currently in operating, the step S500 is processed. An operation instruction corresponding to the operation data of the touch point is retrieved in response to a defined mapping relation of a plurality of operation data and a plurality of operation instructions. For example, when a single click is detected, an instruction of selecting an object is obtained in response, and when a double click is detected, an instruction of opening a subdirectory of the object is obtained in response, etc. The operation includes clicking, dragging, etc., but is not limited to herein. The operation instruction includes selecting a single object, selecting all, opening a subdirectory of the object, etc., which are not limited to the contents listed herein.

Figure 11:
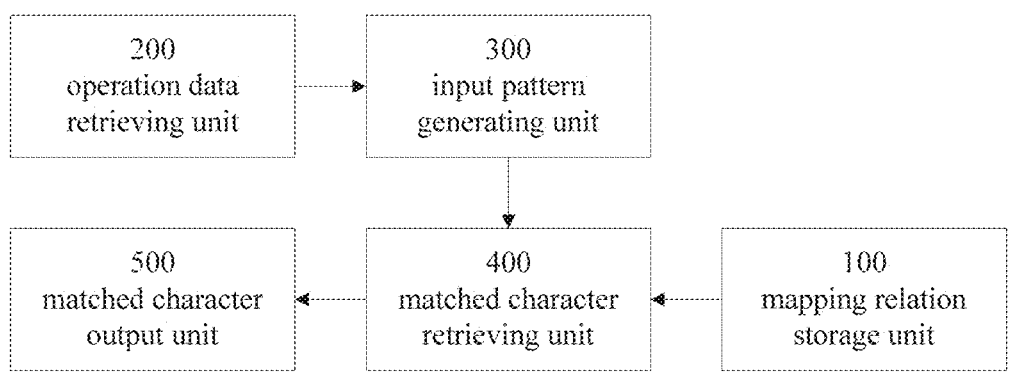
FIG. 11 shows a structural schematic view of an input system for an electronic device of one embodiment of the present disclosure.

FIG. 11 shows an input system for an electronic device of one embodiment of the present disclosure, which includes a mapping relation storage unit 100, an operation data retrieving unit 200, an input pattern generating unit 300, a matched character retrieving unit 400, and a matched character output unit 500. The mapping relation storage unit 100 is configured to store a defined mapping relation of a plurality of input patterns and a plurality of characters. The operation data retrieving unit 200 is configured to retrieve operation data according to a touch point made by a user on an input interface. The input pattern generating unit 300 is configured to generate a pending input pattern in response to the operation data of the touch point. The matched character retrieving unit 400 is configured to retrieve a matched character corresponding to the pending input pattern, in response to the defined mapping relation of the plurality of input patterns and the plurality of characters. The matched character output unit 500 is configured to output the matched character.

The input system of the present disclosure generates the pending input pattern in response to the operation data of the user, and matches the pending input pattern with the character. Therefore, fast input of the character in the input interface with a single finger operation made by the user will be achieved, and shape of the pattern corresponding to the character is easy to be thought by the user, so the input system is operated skillfully without excessive practice.

Figure 12:
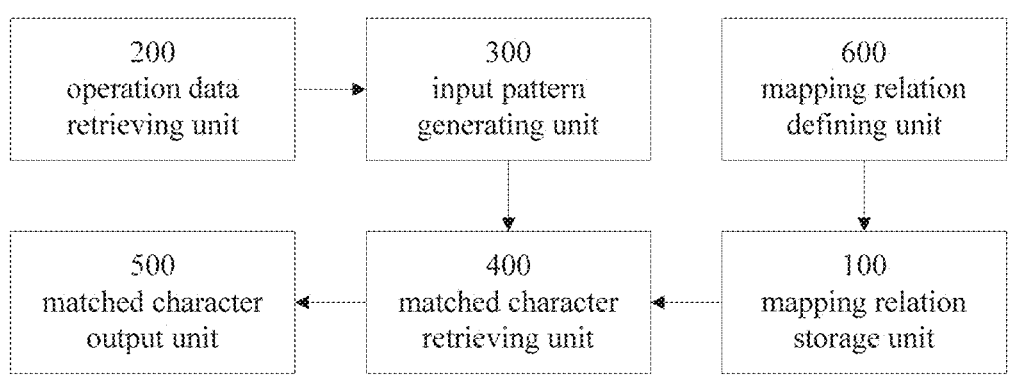
FIG. 12 shows a structural schematic view of an input system having a mapping relation defining unit of the present disclosure.

FIG. 12 shows a structural schematic view of an input system having a mapping relation defining unit of the present disclosure. The mapping relation of the plurality of input patterns and the plurality of characters is the factory setting of the input device, or is predefined by the user. The present disclosure further includes the mapping relation defining unit 600 configured to define the mapping relation of the plurality of input patterns and the plurality of characters. As described above, the configuration of the mapping relation of the plurality of input patterns and the plurality of characters allows the input patterns matched with the characters designed in response to the shapes of the characters. It is convenient for the user to practice the mapping relation of an input pattern and a corresponding matched character, since shapes thereof are quite similar which allows the user, without excessive practice, to conveniently input characters with the input method of the present disclosure.

Figure 13:
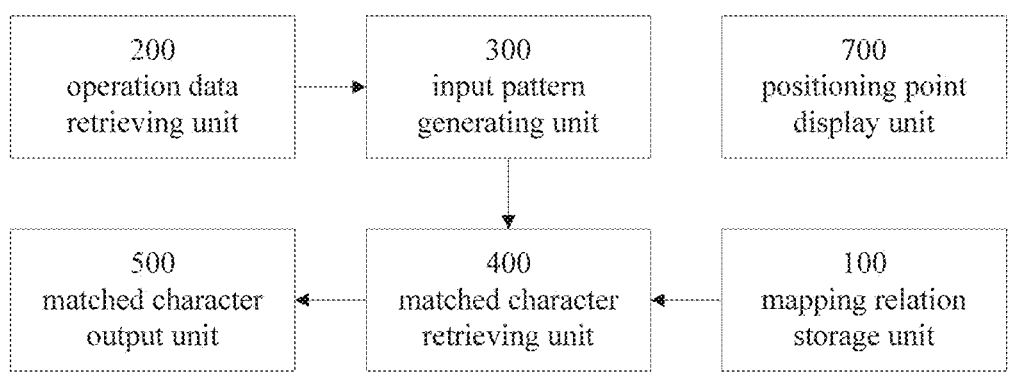
FIG. 13 shows a structural schematic view of an input system having an positioning point display unit of the present disclosure.

FIG. 13 shows a structural schematic view of an input system having a positioning point display unit of the present disclosure. The input system further includes the positioning point display unit 700 configured to display at least one positioning point in the input interface, wherein the positioning point is used to define a positioning pattern.

The input pattern generating unit 300 retrieves a sliding track of the touch point in response to the operation data of the touch point to obtain a positional relation of the sliding track of the touch point and the positioning point, and the pending input pattern is obtained in response to the positional relation and by combining the sliding track of the touch point with the positioning pattern.

In one embodiment, the positioning circle and the positioning points shown in FIG. 3 and the encoding method of English lowercase characters shown in FIG. 4 is used in the input system of the present disclosure, and a simplest input encoding mode is obtained by combining the positioning circle and the positioning points. By combining the positioning points and the positioning pattern, an auxiliary reminding function for inputting of the user will be provided. In the present disclosure, the input workload of the user and the calculation throughput of the system will be reduced, and the input speed will be improved. The specific technical effects are described above, and will not be repeated herein.

Furthermore, the present disclosure further includes an input character type defining unit, configured to retrieve the setting instruction of the input character type of the user, and determine a current input character type in response to the setting instruction. The matched character retrieving unit 400 selects a character, which is corresponding to the pending input pattern and belonging to the current input character type, as the matched character.

Figure 14:
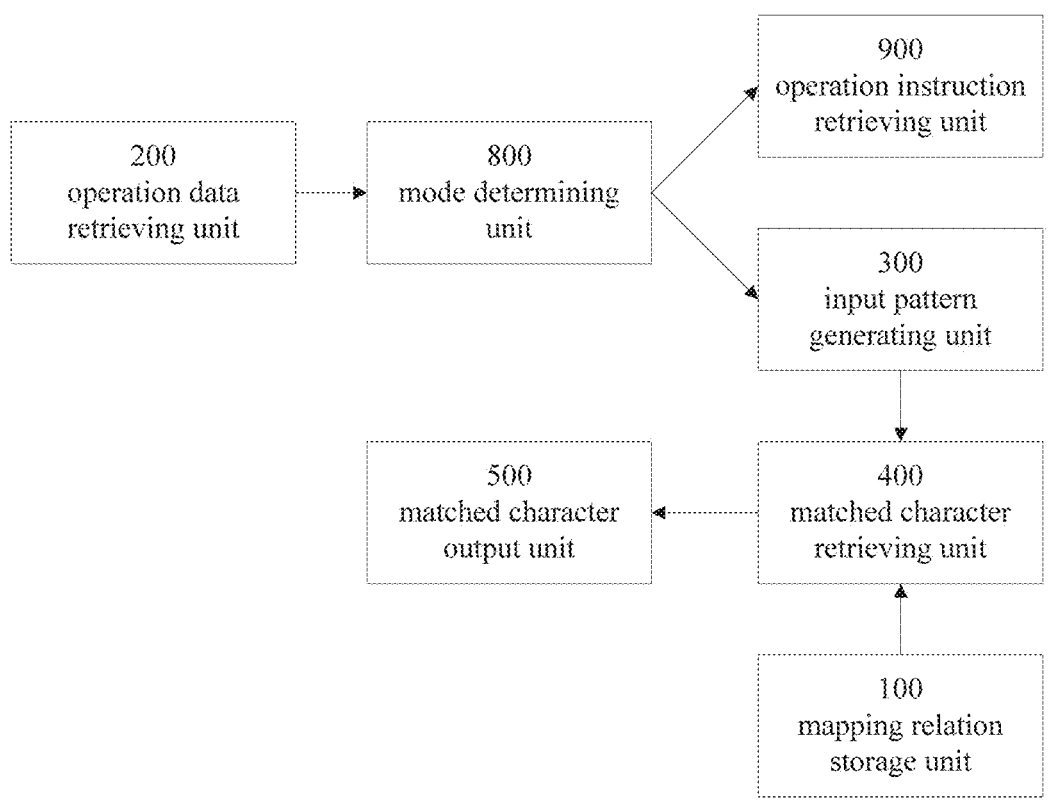
FIG. 14 shows a structural schematic view of an input system having a mode determining unit of the present disclosure.

As shown in FIG. 14, the present disclosure further includes a mode determining unit 800 and an operation instruction retrieving unit 900.

The mode determining unit 800 is configured to determine whether a sliding input mode is currently in operating.

When the sliding input mode is currently in operating, the pending input pattern is generated, by the input pattern generating unit 300, in response to the operation data of the touch point.

When the sliding, input mode is not currently in operating, an operation instruction corresponding to the operation data of the touch point is retrieved, by the operation instruction retrieving unit 900, in response to a defined mapping relation of a plurality of operation data and a plurality of operation instructions. The operation includes clicking, dragging, etc., and the operation instruction includes selecting the object, moving the object, opening a subdirectory of the object, etc.

In the present disclosure, the input content of the user is retrieved by matching the input pattern with the character. Therefore, pressing the keys one by one is not necessary, when a significant pattern is inputted in the input interface by sliding of the user, which provides easy input to the user to input conveniently with a single finger, and provides a touch control input interface without excessive keys. The size of the input device configured with the input method is decreased.

Figure 15:
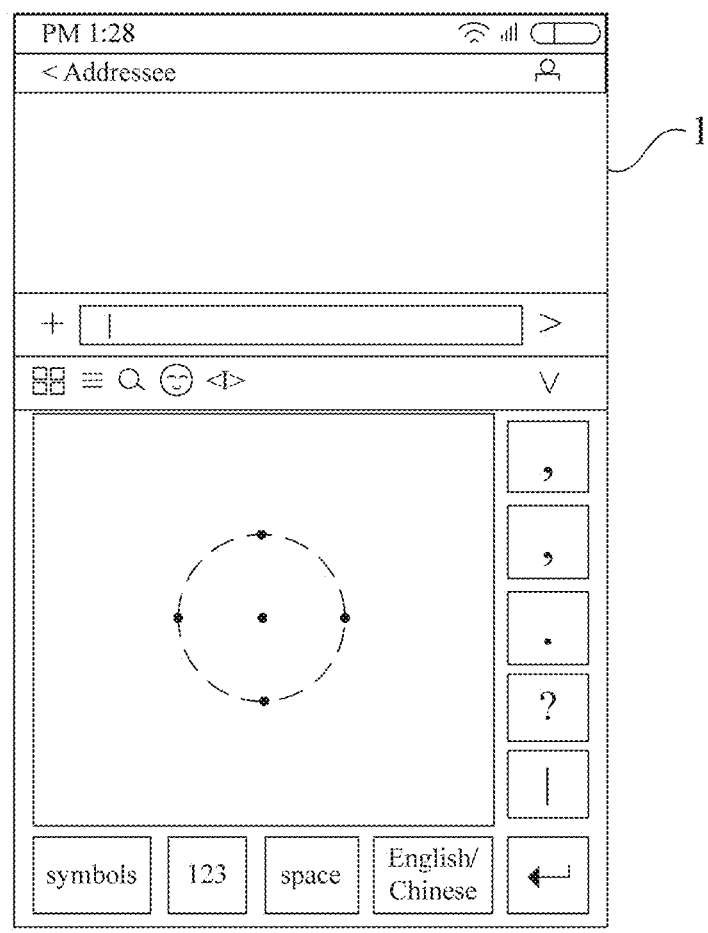
FIG. 15 shows a schematic view of the input system for the electronic device of the present disclosure applied on a mobile device.

The operation data retrieving unit 200 of the present disclosure includes various hardware devices. For example, as shown in FIG. 15, the operation data retrieving unit 200 is integrated in a mobile device 1, and the touch screen of the mobile device 1 is used to display the input interface and receive the operation data of the touch point of the user. Moreover, the mapping relation storage unit 100 and the matched character retrieving unit 400 are included in the mobile device 1, or in a cloud server communicated with the mobile device 1. The integration of the operation data retrieving unit 200 and a computer is the same, which means the operation data of the touch point of the user is retrieved by a touchpad of the computer, and the input interface is displayed by the computer screen.

Figure 16:
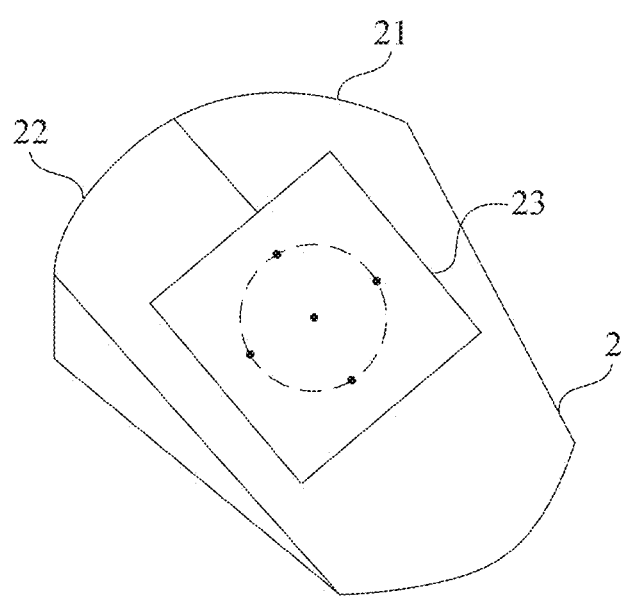
FIG. 16 shows a schematic view of the input system for the electronic device of the present disclosure applied on a mouse.

As shown in FIG. 16, when the input system includes a keyboard input function and a mouse input function, the operation data retrieving unit 200 is integrated in the mouse 2, wherein a touch screen area 23 is disposed on the mouse 2, and two mouse buttons 21 and 22 are disposed on both sides of the touch screen area 23. When input data of the mouse buttons 21 and 22 is detected, a non-sliding input mode will be determined. When input data of the touch screen area 23 is detected, a sliding input mode will be determined. The input interface is disposed within the touch screen area 23, or in a computer connected to the mouse. Moreover, the mapping relation storage unit 100 and the matched character retrieving unit 400 are included in the computer or in a cloud server.

Figure 17:
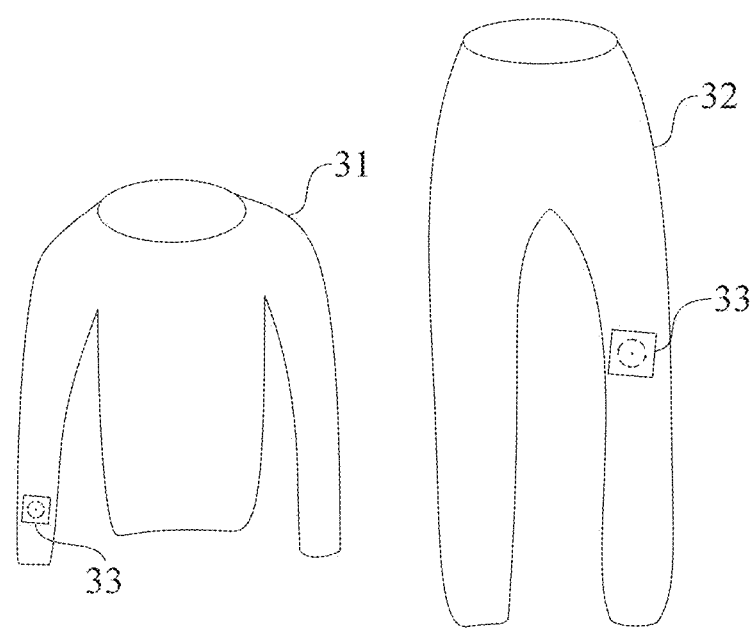
FIG. 17 shows a schematic view of the input system for the electronic device of the present disclosure applied on smart clothes.

As shown in FIG. 17, the operation data retrieving unit 200 is integrated in a smart wearable device. For example, the operation data retrieving unit 200 is integrated with the smart clothing, and is disposed in a suitable area such as the wrist of the clothes 31 and the thigh of the pants 32. The input interface is disposed in a plane surface, or in a non-planar surface having a certain curvature. The input interface and the operation data retrieving unit 200 are disposed in the touch control areas 33 of the smart clothes. The mapping relation storage unit 100 and the matched character retrieving unit 400 are included in a cloud server.

FIGS. 15 to 17 show some embodiments of the present disclosure. In practice, the input system of the present disclosure is implemented on other hardware devices to achieve the technical effects of the present disclosure. The input method and system of the present disclosure are widely implemented on some input devices for human-computer interactions, to significantly improve the input efficiency and user experience of the input device of the prior art for fully satisfying the requirements of character input of users. The hardware, having the functions of the mouse and the keyboard, will have compact size and portability and the operation will be more convenient. During inputting operation, the sliding track is drawn, by the user, in response to the positioning pattern, such that the input efficiency of the user and the data processing efficiency of the input system will be improved. Moreover, the input patterns and the characters are matched in shapes, which facilitate users to memorize, and avoid excessive practice of users when using a new input method.

The input method and system for the electronic device provided by the present disclosure have the advantages of:

The present disclosure provides a technical solution of retrieving the matched character in response to the sliding track of the operation, by which fast input of all characters will be achieved with a single finger. The technical solution matches the input pattern with the character in response to the shape of the input pattern, from which simple features are extracted for encoding, and encoding rules will be easily memorized by the user without excessive memorization and practice. Moreover, excessive keys for support are unnecessary, and the size of the input device will be decreased, which are greatly convenient for users.

What is claimed is:

1. An input method for an electronic device, comprising steps of:

retrieving operation data according to a touch point made by a user on an input interface, wherein the input interface displays at least one positioning point and the positioning point is used to define a positioning pattern;

generating a pending input pattern in response to the operation data of the touch point, which comprises sub steps of: retrieving a sliding track of the touch point in response to the operation data of the touch point, retrieving a positional relation of the sliding track of the touch point and the positioning point, retrieving the pending input pattern by combining the sliding track of the touch point and the positioning pattern, in response to the positional relation; wherein the step of combining the sliding track of the touch point and the positioning pattern comprises, merging, subtracting or intersecting of at least a portion of the sliding track and at least a portion of the positioning pattern, making the pending input pattern comprising a merging area of the sliding track and the positioning pattern, an intersecting area of the sliding track and the positioning pattern, an area of the sliding track excluding an overlapping area of the sliding track and the positioning pattern, or an area of the positioning pattern excluding the overlapping area of the sliding track and the positioning pattern;

retrieving a matched character corresponding to the pending input pattern, in response to a defined mapping relation of a plurality of input patterns and a plurality of characters;

outputting the matched character.

2. The input method for the electronic device of claim 1, wherein the positioning pattern comprises a point, a straight line, a curve line, a broken line, a circle, a polygon, or a combination thereof.

3. The input method for the electronic device of claim 1, wherein the sliding track comprises a point, a straight line, a curve line, a broken line, a circle, a polygon, or a combination thereof.

4. The input method for the electronic device of claim 1, wherein the positioning pattern is a circle and the positioning point comprises a central positioning point and a plurality of edge positioning points, wherein the central positioning point is located at the center of the positioning pattern, and the plurality of edge positioning points are evenly distributed at the circumference of the circle.

5. The input method for the electronic device of claim 1 further comprising steps of retrieving a setting instruction of an input character type inputted by the user, and determining a current input character type in response to the setting instruction;

selecting a character, which corresponds to the pending input pattern and belonging to the current input character type, as the matched character.

6. The input method for the electronic device of claim 5, wherein the input character type comprises English lowercase characters, English capital characters, numeric characters, punctuation characters, unit characters, emotion characters, or a combination thereof.

7. The input method for the electronic device of claim 1 further comprising determining whether a sliding input mode is currently in operating, before the step of generating the pending input pattern;

when the sliding input mode is currently in operating, the pending input pattern is generated in response to the operation data of the touch point.

8. The input method for the electronic device of claim 1 further comprising defining the mapping relation of the plurality of input patterns and the plurality of characters.

9. The input method for the electronic device of claim 1 further comprising determining whether a sliding input mode is currently in operating, before the step of generating the pending input pattern;

when the sliding input mode is not currently in operating, an operation instruction corresponding to the operation data of the touch point is retrieved in response to a defined mapping relation of a plurality of operation data and a plurality of operation instructions.

10. An input system for an electronic device, comprising:
a mapping relation storage unit, configured to store a defined mapping relation of a plurality of input patterns and a plurality of characters;
an operation data retrieving unit, configured to retrieve operation data according to a touch point made by a user on an input interface;
a positioning point display unit configured to display at least one positioning point in the input interface, wherein the positioning point is used to define a positioning pattern;
an input pattern generating unit, configured to generate a pending input pattern in response to the operation data of the touch point; wherein the input pattern generating unit retrieves a sliding track of the touch point in response to the operation data of the touch point to obtain a positional relation of the sliding track of the touch point and the positioning point, and the pending input pattern is obtained in response to the positional relation and by combining the sliding track of the touch point and the positioning pattern; wherein the step of combining the sliding track of the touch point and the positioning pattern comprises, merging, subtracting or intersecting of the sliding track and the positioning pattern, making the pending input pattern comprising a merging area of the sliding track and the positioning pattern, an intersecting area of the sliding track and the positioning pattern, an area of the sliding track excluding an overlapping area of the sliding track and the positioning pattern, or an area of the positioning pattern excluding the overlapping area of the sliding track and the positioning pattern;
a matched character retrieving unit, configured to retrieve a matched character corresponding to the pending input pattern, in response to the defined mapping relation of the plurality of input patterns and the plurality of characters;
a matched character output unit, configured to output the matched character.

11. The input system for the electronic device of claim 10, wherein the positioning pattern is a circle and the positioning point comprises a central positioning point and a plurality of edge positioning points, wherein the central positioning point is located at the center of the positioning pattern, and the plurality of edge positioning points are evenly distributed at the circumference of the circle.

12. The input system for the electronic device of claim 10 further comprising a mode determining unit and an operation instruction retrieving unit;

wherein the mode determining unit is configured to determine whether a sliding input mode is currently in operating;

when the sliding input mode is currently in operating, the pending input pattern is generated, by the input pattern generating unit, in response to the operation data of the touch point.

13. The input system for the electronic device of claim 10 further comprising a mapping relation defining unit configured to define the mapping relation of the plurality of input patterns and the plurality of characters.

14. The input system for the electronic device of claim 10, wherein the operation data retrieving unit is integrated in a mobile device, a touchpad, a mouse or a smart wearable device.

15. The input system for the electronic device of claim 10 further comprising a mode determining unit and an operation instruction retrieving unit;
   wherein the mode determining unit is configured to determine whether a sliding input mode is currently in operating;
   when the sliding input mode is not currently in operating, an operation instruction corresponding to the operation data of the touch point is retrieved, by the operation instruction retrieving unit, in response to a defined mapping relation of a plurality of operation data and a plurality of operation instructions.

* * * * *